(12) United States Patent
Smart

(10) Patent No.: US 10,851,502 B2
(45) Date of Patent: Dec. 1, 2020

(54) SOLAR POWERED ILLUMINATED SAFETY MARKER AND IMPROVED HOUSING THEREFOR

(71) Applicant: Smart Safety Marker, LLC, Oklahoma City, OK (US)

(72) Inventor: Harold Smart, Oklahoma City, OK (US)

(73) Assignee: Smart Safety Marker, LLC, Oklahoma City, OK (US)

( * ) Notice: Subject to any disclaimer, the term of this patent is extended or adjusted under 35 U.S.C. 154(b) by 0 days.

(21) Appl. No.: 16/447,661

(22) Filed: Jun. 20, 2019

(65) Prior Publication Data

US 2019/0390420 A1 Dec. 26, 2019

Related U.S. Application Data

(60) Provisional application No. 62/687,621, filed on Jun. 20, 2018.

(51) Int. Cl.
*E01F 9/50* (2016.01)
*E01F 9/559* (2016.01)
*F21S 9/03* (2006.01)

(52) U.S. Cl.
CPC .............. *E01F 9/559* (2016.02); *F21S 9/037* (2013.01)

(58) Field of Classification Search
CPC .................................. E01F 9/559; F21S 9/037
USPC ........................................ 404/12–16, 72, 75
See application file for complete search history.

(56) References Cited

U.S. PATENT DOCUMENTS

| | | | | |
|---|---|---|---|---|
| 1,798,468 A | * | 3/1931 | Hartzler | E01F 9/553 52/698 |
| 2,076,970 A | * | 4/1937 | Smith | E01F 9/553 404/15 |
| 3,040,636 A | * | 6/1962 | Simm | E01F 9/588 404/15 |
| 3,851,615 A | | 12/1974 | Grundvig et al. | |
| 4,358,217 A | | 11/1982 | Stone | |
| 4,570,207 A | | 2/1986 | Takahashi et al. | |
| 4,668,120 A | * | 5/1987 | Roberts | F21S 9/037 404/12 |
| 4,854,768 A | * | 8/1989 | Flanagan | E01F 9/571 404/11 |

(Continued)

FOREIGN PATENT DOCUMENTS

| | | |
|---|---|---|
| JP | H0726524 | 1/1995 |
| JP | 2009048983 | 3/2009 |
| KR | 101251850 B1 | 4/2013 |

OTHER PUBLICATIONS

Pavement Markers,http://www.usreflector.com/PDF%20files/catalog2009/USreflector-Pavment-markers.pdf, US Reflectors Corporation, undated.

(Continued)

*Primary Examiner* — Raymond W Addie
(74) *Attorney, Agent, or Firm* — Dunlap Codding, P.C.

(57) ABSTRACT

A self-contained solar-powered illuminated safety marker having an improved housing design adapted for secure, flush-mounting into a road surface which includes a projection positioned to extend vertically downward from the bottom surface of the safety marker to secure the housing in its flush mounted position into a road surface and a solar cell with circuitry designed to illuminate the safety marker in response to a variety of environmental conditions.

22 Claims, 11 Drawing Sheets

(56) References Cited

U.S. PATENT DOCUMENTS

| | | | |
|---|---|---|---|
| 5,013,181 A | 5/1991 | Harrison | |
| 5,782,552 A | 7/1998 | Green et al. | |
| 5,839,816 A | 11/1998 | Varga | |
| 6,478,506 B1* | 11/2002 | Figlewicz | E01F 9/571 |
| | | | 404/11 |
| 6,558,069 B1* | 5/2003 | Flader | E01F 9/20 |
| | | | 404/12 |
| 7,018,131 B2 | 3/2006 | Jordan | |
| 7,249,911 B2* | 7/2007 | Hyams | E01C 19/44 |
| | | | 404/15 |
| 7,347,643 B2 | 3/2008 | Jeong | |
| 7,401,997 B1* | 7/2008 | Chen | E01F 9/553 |
| | | | 404/11 |
| 8,182,170 B1* | 5/2012 | Blanton | E01F 9/541 |
| | | | 404/7 |
| 8,840,335 B2 | 9/2014 | Martin et al. | |
| 2005/0152142 A1 | 7/2005 | Traynor | |
| 2006/0193691 A1* | 8/2006 | Gonzalez | E01F 9/559 |
| | | | 404/15 |
| 2007/0201948 A1* | 8/2007 | Harward | E01F 11/00 |
| | | | 404/15 |
| 2007/0217864 A1* | 9/2007 | Yang | E01F 9/582 |
| | | | 404/12 |
| 2017/0002527 A1 | 1/2017 | Bahiri et al. | |

OTHER PUBLICATIONS

How to Install Solar Road Studs by Screws, http://www.youtube.com/watch?v=vbZmSG-OEs8, undated.

* cited by examiner

SOLAR POWERED ILLUMINATED SAFETY MARKER AND IMPROVED HOUSING THEREFOR

INCORPORATION BY REFERENCE

The present patent application hereby incorporates by reference and claims priority to the provisional patent application identified by U.S. Ser. No. 62/687,621, filed on Jun. 20, 2018.

FIELD OF THE DISCLOSURE

The presently described and claimed inventive concept(s) relate to a solar-powered illuminated safety marker, and, more particularly, to a self-contained solar-powered illuminated safety marker having an improved housing design adapted for secure, flush-mounting attachment to a road, e.g., street, interchange, intersection, or a highway. The housing includes a rigid projection, e.g., a spiral member, surrounding a central opening attached to the outer surface of the housing's bottom portion, positioned to extend vertically downward therefrom to secure the housing in a flush mounted position into a road surface.

BACKGROUND OF THE DISCLOSURE

Reflectors for highway traffic markers, delineators, and other safety devices may be color coded, and illuminated reflectors may be used to delineate highway traffic lanes, roadway edges, intersections, interchanges, pedestrian crossings, exit and entry ramps, and the like. Pavement markers of the type, for example, described in U.S. Pat. No. 3,332,337, comprise a shell having a generally horizontal base for engaging a roadway surface. The shell includes a marking and is positioned on a generally horizontal roadway surface to be visible from oncoming traffic.

A problem with such highway markers and reflectors is that they are passive devices mounted on the surface of the highway that provide roadway markings visible from oncoming traffic solely as a result of their ability to reflect light. Being mounted on the surface of the highway, not flush with the highway surface, the useful life of such markers can be substantially reduced due to repetitive contact from cars and especially from the wheels of heavy-duty semi-tractor trailered vehicles.

Road markers that are designed to be flush with and preferably slightly below the grade of the surface of the road are also previously known. See, for example, U.S. Pat. No. 5,839,816. Such road markers may be either solar operated, with rechargeable batteries so that light emitting diodes which are connected to the battery source may be turned on during darker night conditions to provide illumination along the boundary lines between traveling lanes along the highway.

In some cases, raised pavement markers were not mounted flush with the road surface, and included a smooth, tapered support that was epoxied into a hole formed in the road surface. See, for example, U.S. Pat. No. 7,347,643. This type of conventional road marker (or road stud) required a separate bonding material, such as an epoxy or cement, to be buried in the road. The epoxy or cement can be damaged by repetitive shock that can occur when cars pass over the road stud, and over time the road stud can be dislodged from its mounting. In the case of conventional raised pavement markers, they typically weighed about 5 lbs., in some cases the raised pavement markers can weigh 5.6 lbs., the housing had a smooth sidewall and a planar bottom. Although being mounted within the road, in practice, they were easily dislodged by cars and trucks passing over them. In some cases, the dislodged road markers became projectiles that damaged cars and even injuring or killing people. Due to these deficiencies, there has been limited adoption of raised pavement markers.

A need exists for a solar powered road marker that includes improved storage capability for an electrical charge, is lighter in weight than conventional raised pavement markers, and has improved abilities to remain securely mounted within the road. It is also highly desirable to provide such a solar powered road marker that includes a photovoltaic power system having improved circuitry that is responsive to a variety of environmental conditions, such as, for example, rain, temperature variations, and low lights conditions, e.g., nightfall, to warn drivers accordingly.

SUMMARY

According to one embodiment, the disclosure describes an improved housing for a safety marker suitable for use on a road, such as a highway. The housing comprises a base having a shaped bottom portion that may have a planar configuration. An upstanding side wall is attached about a periphery of the bottom portion that defines a receptacle that may correspond to the shape of the bottom portion. In one embodiment the base and sidewall can be molded as a single unit wherein the sidewall and base are integrally connected, such as through injection molding.

In some embodiments, the sidewall terminates in a flange having an upstanding peripheral edge, which, in turn, defines a recess for receiving a cover. A plurality of outwardly extending fins are positioned in generally vertical spaced relationship about the periphery of the sidewall below the flange. When the housing is installed, the fins extend into the road sub-surface composition, i.e., below the road surface, to provide anchoring stability to the housing installation. A rigid spiral member, preferably having an open central area, is attached to the outer surface of the planar bottom portion of the receptacle and is arranged to extend vertically downward from the housing into the road sub-surface composition to further secure the housing when flush mounted into a road surface using a high-strength epoxy. A cover, shaped to conform to the recess in the flange, seals the receptacle. In this embodiment, the outwardly extending fins, rigid spiral member, and high-strength epoxy serve to secure the housing to the road sub-surface composition, thereby reducing the opportunity for the safety marker to be dislodged from its installed position by a passing car or truck and launched as a projectile. In one embodiment, a projection, surrounding an opening, is attached to the outer surface of the planar bottom portion of the base and is arranged to extend vertically downward from the base into the road sub-surface composition to further secure the housing installed into a road surface. The housing can be installed into the road surface such that the peripheral edge of the base is flush with the road surface, and can be secured in the road surface using high-strength epoxy.

According to an alternative embodiment, the disclosure describes an improved self-contained safety marker comprising a housing having a base and a cover. The base has a shaped bottom portion with an upstanding side wall extending about the periphery of the bottom portion to define a receptacle. The receptacle may correspond to the shape of the planar bottom portion, and the sidewall may terminate in a flange having an upstanding peripheral edge which defines a recess for receiving a cover. The safety marker may include at least one first LED light source having a first color (e.g., red) and at least one second LED light source having a second color (e.g., white) mounted below the cover and within the receptacle. In one embodiment, the first LED light source and the second LED light source may have the same color. In this embodiment, the first color can be amber, for example. The cover may be configured in cooperation with each light source to magnify and transmit light from each light source outwardly in a predetermined direction toward on coming road or pedestrian traffic. As with the improved housing, a plurality of fins are attached and extend outwardly in generally vertical spaced relationship about the periphery of the housing sidewall below the flange. When the housing is installed into a pre-drilled opening through a road surface and in a road sub-surface composition using a high-strength epoxy, the fins extend into the high strength epoxy below the roadway surface and provide anchoring stability to the housing installation. A rigid spiral member has one end attached to the bottom portion with the other end positioned to extend vertically downward from the bottom portion of the housing base into the high-strength epoxy when the safety marker is installed. The spiral member and the fins operate in cooperation with the epoxy to firmly secure the housing into the roadway sub-surface composition when the housing is flush mounted into the roadway surface. The cover, shaped to conform to the recess in the flange, seals the receptacle.

In some embodiments, the self-contained safety marker further comprises circuitry including, but not limited to:

a) at least one photovoltaic solar panel (i.e., solar cell) communicating with the at least one first light source and the at least one second light source mounted below the cover. Each of the first and second light sources may be arranged to magnify and transmit light outwardly in a predetermined direction toward on coming vehicular or pedestrian traffic in response to a signal from a light sensing circuit;

b) at least one electricity storage medium, e.g., a supercapacitor, communicating with the photovoltaic solar panel and with the at least one first light source and the at least one second light source for storing electricity generated by the at least one photovoltaic solar panel;

c) at least one light sensing circuit arranged to receive input from either said photovoltaic solar cell or said electricity storage medium and thereby generate and communicate a signal to the at least one first light source and the at least one second light source in response to a nighttime condition (i.e., from dusk to dawn);

d) at least one light control circuit, e.g., a demultiplexer, including at least two light selector circuits, arranged to receive signals generated by the at least one light sensing circuit and energize the at least one first light source and the at least one second light;

e) a temperature sensing and switching circuit communicating with the electricity storage medium and arranged to produce an output signal when the surrounding temperature drops below a threshold, e.g., 34° F., and simultaneously transmit the output signal to the first or second light source and/or to the at least one light control circuit, and thereby energize the at least one first light source and the at least one second light source; and f) a rain sensor circuit configured to sense the presence of moisture in the form of rain or drizzle on the cover with the result that a signal is communicated to the light control circuit to thereby energize at least one of the first or second light sources. The rain sensor circuit may include adjacently disposed leads embedded within the surface of the cover and arranged for directly sensing moisture, or an optical sensor and related switching circuits indirectly monitoring the cover for the presence of moisture.

The described circuitry is provided for selectively enabling the operation of the safety marker across a variety of atmospheric and environmental conditions while minimizing power requirements and extending the useful performance life of the safety marker. The safety marker according to the improved housing design described herein is arranged for secure flush mounting into a road surface using high strength epoxy to thereby provide maintenance free operation over an extended useful life of the marker when compared to conventional surface mounted safety markers.

BRIEF DESCRIPTION OF THE DRAWINGS

The above advantages and novel features of the described inventive concept(s) will become apparent from the following detailed description of the various alternative embodiments of the safety marker and housing illustrated in the accompanying drawings, wherein.

DETAILED DESCRIPTION

Figure 1:
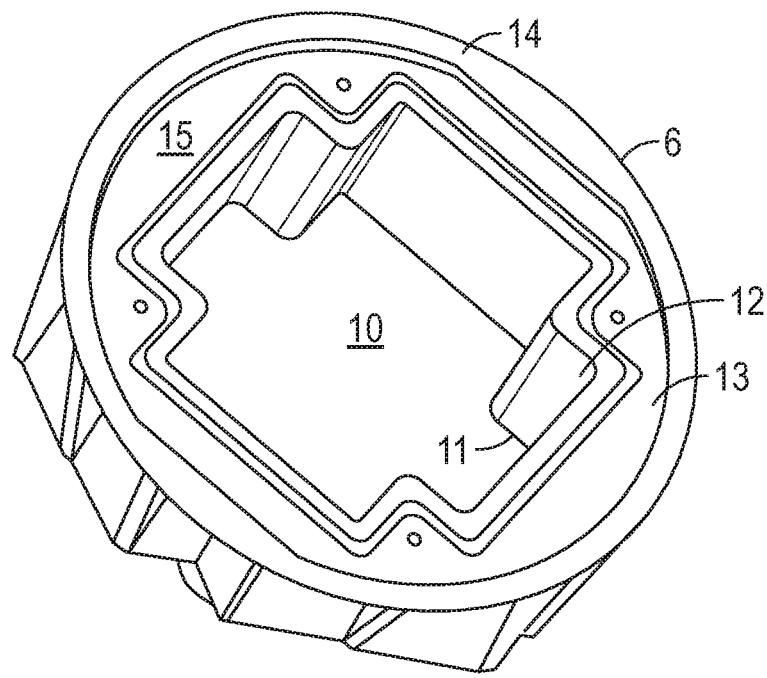
FIG. 1 is a perspective view of an exemplary housing receptacle according to the inventive concept(s).

In the following detailed description of embodiments, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may also include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

In accordance with the present disclosure, certain components of the self-contained safety marker include circuitry. Circuitry, as used herein, could be analog and/or digital components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more components cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based. Further, the signals described herein may be generated by the components and result in various physical transformations.

Figure 2:
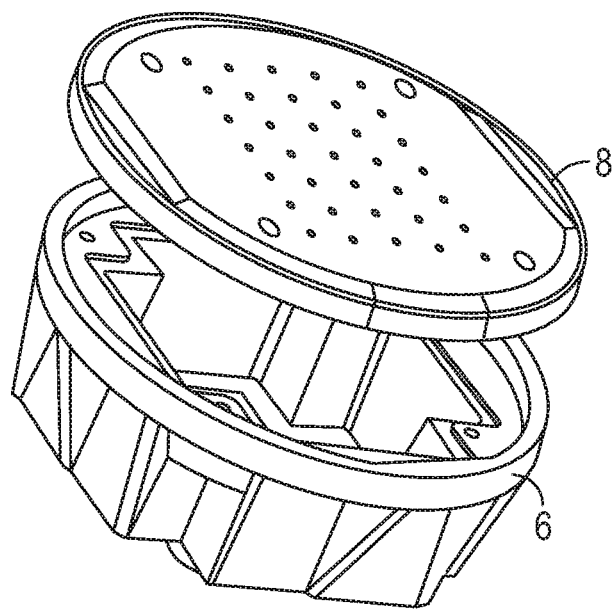
FIG. 2 is a perspective view of a cover shown in relation to the housing receptacle according to the inventive concept(s).
Figure 3:
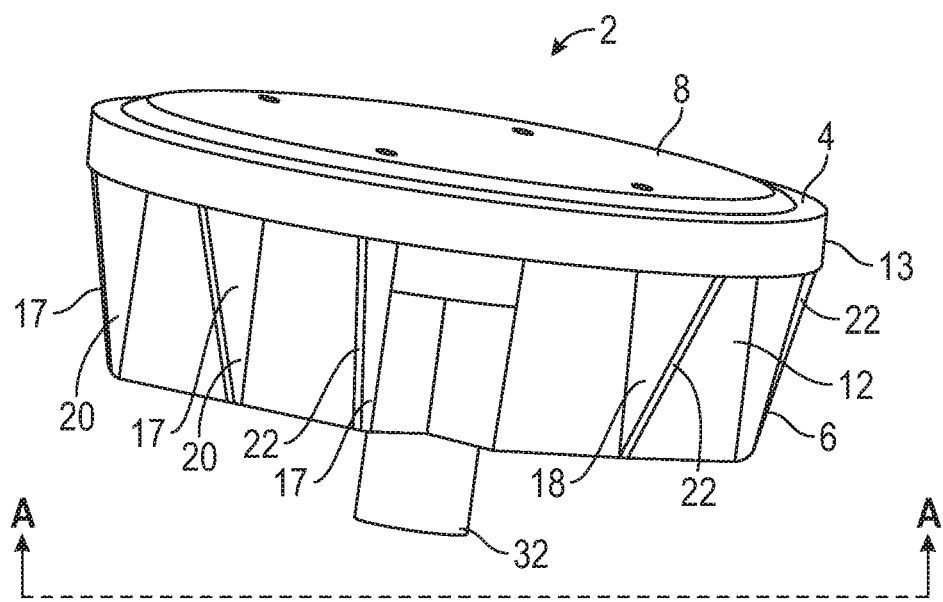
FIG. 3 is an elevational view of the housing receptacle which illustrates an attachment point for a helical coil and a plurality of fins extending outwardly in generally vertical spaced relationship about the periphery of the receptacle sidewall below the flange.

Referring now to FIGS. 1-3, shown therein is a self-contained road safety marker 2 (hereinafter referred to as a "safety marker") constructed in accordance with the present disclosure. Safety marker 2 is provided with an improved housing 4 comprising a base 6 and a cover 8. Base 6 comprises a shaped bottom portion 10 having a periphery 11 connected to an upstanding continuous sidewall 12 which extends as shown about periphery 11 of bottom portion 10. Bottom portion 10 with sidewall 12 results in a receptacle configuration having twelve integral vertical sidewall portions 12 which provides a design that exhibits very desirable structural integrity for the application. More or fewer sidewalls portions 12 can be provided.

Upstanding continuous sidewall 12 terminates in a flange 13 having an upstanding peripheral edge 14, which thereby defines a recess 15 for receiving the cover 8 (FIG. 2). Cover 8 receives a load from a passing vehicle and transfers the load to sidewall 12 of base 6. Base 6 is configured to transfer the load to the subsurface roadway composition immediately below the base 6. In this design, the contact surface area between cover 8 and base 6 (i.e., within recess 15) allows efficient load transfer by avoiding any stress concentrations. As can be seen in FIG. 2, recess 15 is preferably devoid of any sharp edges or corners (e.g., smooth and rounded corners are used) to avoid stress concentrations at any point in base 6.

Figure 4:
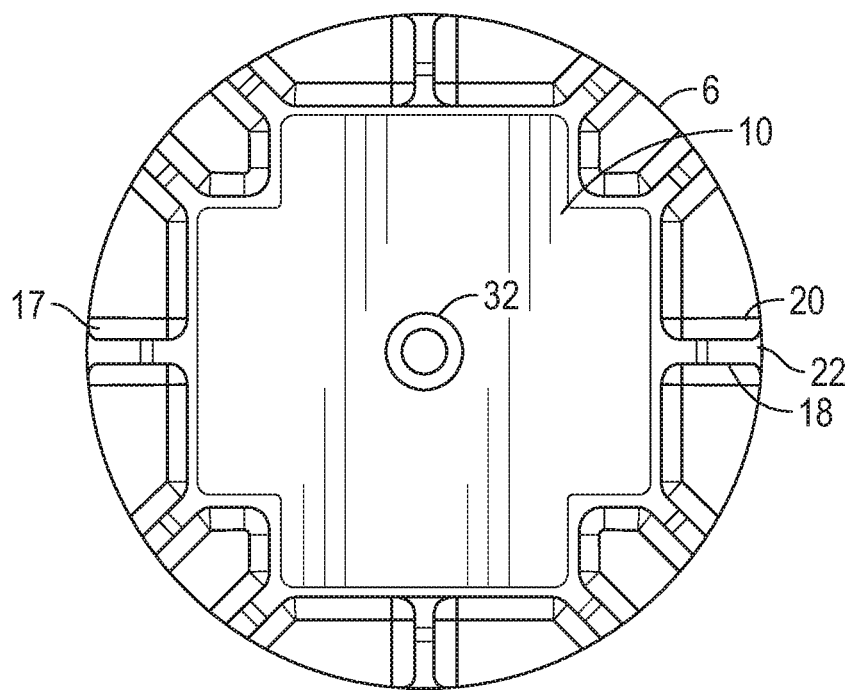
FIG. 4 is a bottom plan view of the housing receptacle taken along line A-A of FIG. 3.

Referring now to FIGS. 3 and 4, a plurality of outwardly extending fins 17 are arranged in generally vertical spaced relationship about the periphery 11 of sidewall 12 below flange 13. In the example shown, fins 17 extend from flange 13 to bottom portion 10, and serve to provide additional structural integrity to base 6. Fins 17 improve the strength of the sidewalls 12 by increasing the surface area in contact with the high-strength epoxy used to secure the base 6 into a road surface, as will be discussed below in greater detail with reference to FIG. 9. The road can be constructed of any suitable material or materials, including but not limited to asphalt or concrete. When the road is made from asphalt or concrete, a suitable epoxy may conform to the standards set forth by the American Association of State Highway and Transportation Officials (AASHTO) in the AASHTO M-237 Type IV, Epoxy Resin Adhesives, or AASHTO Designation M 237-96 (2005). Examples of suitable epoxy is available under the brand name DURADHESIVE™ Epoxy Resin Part A and DURADHESIVE™ Hardener Part B #71714 and is obtainable from P3 Infrastructure, Inc. Fins 17 may also utilize comparatively less material by providing better load transfer. Here, the fins 17, which have opposing surfaces 18 and 20 and an outer edge 22, are placed at various angles about the periphery 11 of sidewall 12 to distribute stress concentration to the epoxy and the ground in an efficient manner. In the example shown, the fins 17 extend substantially perpendicular from flange 13 to bottom portion 10; however, it would be understood to those of ordinary skill in the art that the fins 17 may extend at an angle not perpendicular from the flange 13 to the bottom portion 10, such as an 85° angle.

The fins 17 have opposing surfaces 18 and 20 and an outer edge 22. Not all of the fins 17, outer edges 22, or the opposing surfaces 18, and 20 have been labeled for purposes of clarity. The fins 17 are arranged to extend into the sub-surface roadway composition to thereby assist in stabilizing the safety marker 2 against dislodgement from traffic passing over the marker. The improved housing configuration results in more efficient load distribution to the surrounding roadway composition in which the housing is mounted while avoiding areas of stress concentration.

Figure 5:
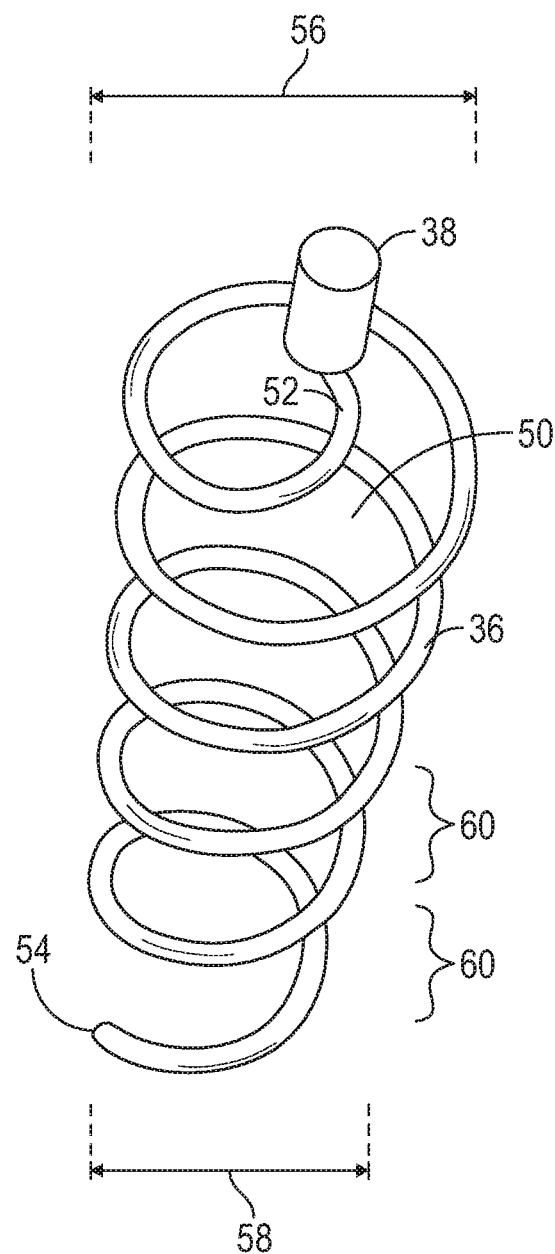
FIG. 5 illustrates a perspective view of an exemplary spiral member according to one aspect of the inventive concept(s).

Bottom portion 10 is provided with one or more port 32. As best shown in FIG. 4, the bottom portion 10 can be provided with one port 32 positioned in a center of the bottom portion 10. Each of the one or more port 32 is arranged to receive and securely hold a projection, which in this example, is a spiral member 36 such as a coil (FIG. 5). As used in this disclosure, the term "coil" is intended to include helical coils and any other coil configuration comprising a length of rigid wire wound in a joined sequence of concentric rings. As shown in FIG. 5, in this example, spiral member 36 includes at one end a mounting pin 38 arranged for insertion into port 32. In some embodiments, mounting pin 38 and the port 32 may be threaded so that the mounting pin 38 may be screwed into port 32. Mounting pin 38 and port 32 can be configured to connect in other ways in alternate embodiments. Spiral member 36, when assembled and connected with the port 32, is thereby configured to extend vertically downward into sub-surface composition 108 when safety marker 2 is fully installed. Spiral member 36 may be helically shaped and surround a central opening 50, in some embodiments. Further, the spiral member 36 has a first end 52, a second end 54, a first diameter 56 at the first end 52, and a second diameter 58 at the second end 54. In the example shown in FIG. 5, first diameter 56 is larger than second diameter 58. Thus, spiral member 36 can be tapered downwardly from mounting pin 38 adjacent to the first end 52 to the second end 54. Further, in some embodiments, the spiral member 36 has a plurality of coil sections 60 with each coil section 60 of the spiral member traversing 360 degrees. In the example shown, each coil section 60 is substantially equally spaced from adjacent coil sections 60. However, it should be understood that spiral member 36 may be provided with other configurations without departing from the spirit and scope of the disclosure. For example, spiral member 36 may have a generally uniform diameter, or an increasing diameter along its length, and produce satisfactory results. In some embodiments, spiral member 36 may have a length in a range of from 3 inches to 9 inches between first end 52 and second end 54. It has been observed that spiral member 36 surrounding the central opening 50, in some embodiments, increases the total surface area of the safety marker 2 in contact with and adhered to the high-strength epoxy used to secure the safety marker 2, as discussed below, thereby increasing the installation's total gripping strength, and decreasing the likelihood that the safety marker will be inadvertently dislodged from its anchor point in the road.

Figure 6:
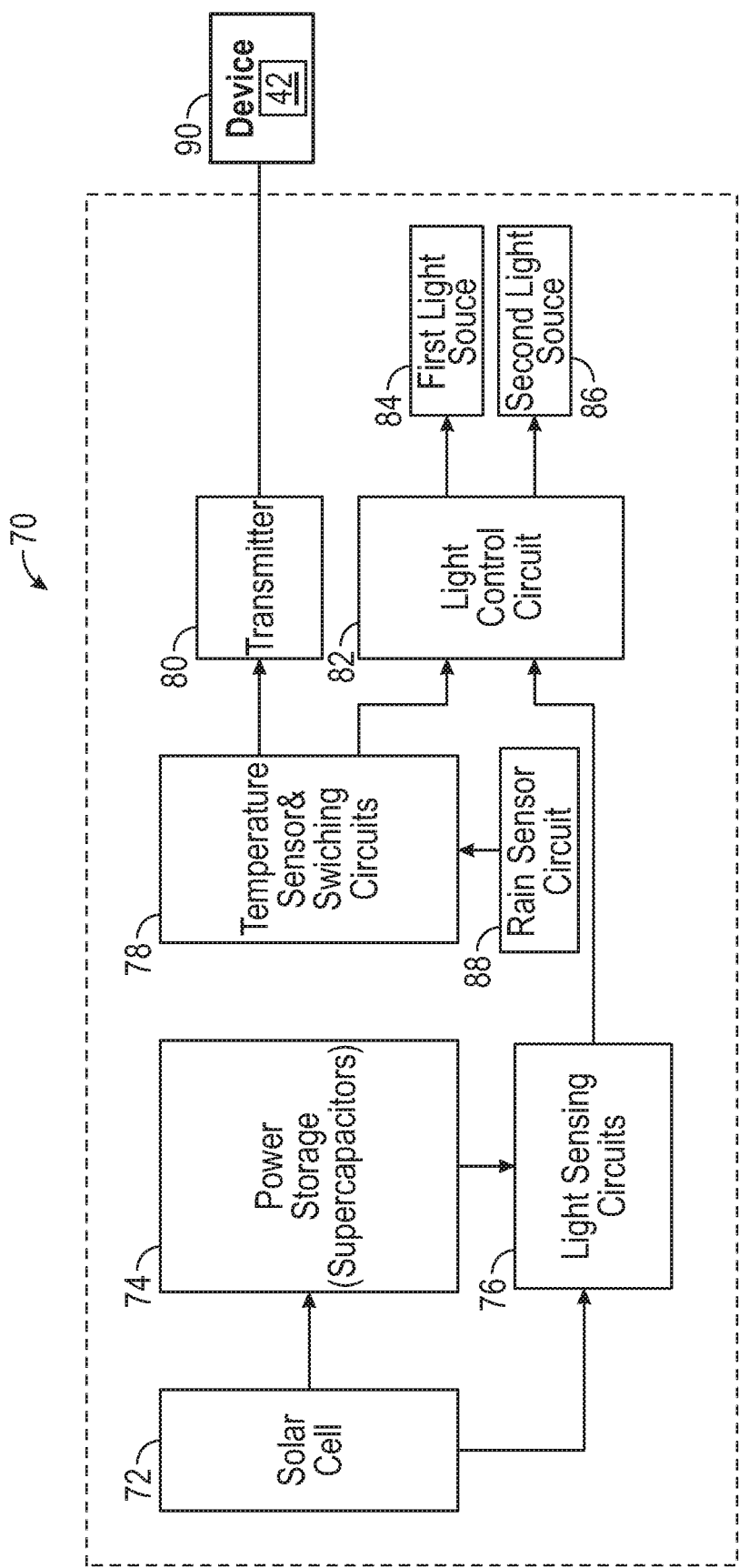
FIG. 6 is a block diagram which illustrates light sensing, rain sensing, and temperature sensing circuitry according to one embodiment of the inventive concept(s).

As noted above and in reference to FIG. 6, safety marker 2 includes a circuit 70 configured to generate electricity, provide warning lights, and notify drivers and/or onlookers of current road conditions. In the example shown in FIG. 6, circuit 70 is provided with a plurality of circuit components including, but not limited to, a solar cell 72, power storage unit 74, a light sensing circuit 76, a temperature sensor and switching circuit 78, a transmitter 80, at least one light control circuit 82, a first light source 84, a second light source 86, and a rain sensing circuit 88. Examples of these circuit components are discussed below.

Solar cell 72 is configured to absorb sunlight as a source of energy to generate electricity to power the components of safety marker 2. Solar cell 72 can be, for example, a monocrystalline or a polycrystalline solar cell. Among the two major types of solar panels, i.e., monocrystalline and polycrystalline, monocrystalline panels have been shown to be more efficient for this type of application. For example, solar cell 72 can be a 5V 0.7 W monocrystalline and polyethylene terephthalate (PET) panel. PET laminated panels are preferred for their extended lifetime vs. resin laminated solar panels.

Power storage unit 74 can be a battery, or a supercapacitor. A supercapacitor is a high-capacity capacitor which can typically store from 10 to 100 times more energy per unit volume or mass than electrolytic capacitors, and can be used in applications such as described herein requiring many rapid charge/discharge cycles rather than long term compact energy storage. For example, power storage unit 74 may include two 2.7V 150 F ultra-supercapacitors according to one embodiment. Energy being generated by solar cell 72 during daylight hours is provided to the other circuit components, and any excess electricity is stored in power storage unit 74 for later use by circuit components and the LEDs during periods of low light, such as at nighttime or during overcast conditions in inclement weather.

Light sensing circuit 76 receives electrical input from solar cell 72 and produces an output signal corresponding to whether a day or night (e.g., low light) condition exists. Light sensing circuit 76 can be implemented in a variety of ways, such as a central processing unit programmed with a calendar and a clock, equipped with sunset, daytime, dusk, and nighttime information. In other embodiments, light sensing circuit 76 may monitor the electric output of solar cell 72 within a threshold range to determine whether daytime or nighttime conditions exist. For example, if the electric output of solar cell 72 has a voltage or a current above the threshold, then light sensing circuit 76 may produce an output signal indicating that daytime conditions exist. When the voltage or a current output of solar cell 72 drops below the threshold, then light sensing circuit 76 may produce an output signal indicating that nighttime conditions exist. When a nighttime condition is detected, e.g., a pre-set low light condition as dusk approaches sundown, light sensing circuit 76 communicates a corresponding signal to light control circuit 82, which, in turn, energizes first and/or second light sources 84 and 86. The threshold can be predetermined and/or dynamically determined. For example, to determine when nighttime conditions exist, the threshold can be determined based upon a lower voltage level produced by solar cell 72 over a period of time, such as the preceding three hours.

First light source 84 can be at least one LED color light source, such as red, white (e.g., crystal), amber, and second light source 86 can be at least one LED color light source, such as red, white (e.g., crystal), amber. However, other types of light sources and/or light colors can also be used. In some embodiments, first light source 84 and second light source 86 are small, compact SMD LEDs. An SMD LED (surface-mount device light-emitting diode) is a type of LED module that uses surface-mount technology to mount LED chips on printed circuit boards. Each LED light source, for example, is a self-contained surface-mount LED device designed either to function on its own or to plug into a compatible unit. This type of LED light source is well suited for use in safety marker 2 because it has a relatively low energy consumption level. In some embodiments, first and second light sources 84 and 86 include a lens 87 (FIG. 8A) on an upper portion that is arranged to magnify the emitted light and make the emitted light visible to oncoming drivers who may be hundreds, if not thousands, of feet away.

Temperature sensing and switching circuit 78 may comprise a TMP 36 low voltage precision temperature sensor which is arranged to generate an output signal when the temperature of the road surface surrounding safety marker 2 drops below a predetermined threshold of, for example, 34° F. Temperatures at or below 34° F. are known to result in icy or slick roadway conditions. The threshold can be predetermined or dynamically adjusted, however, depending upon environmental factors that may affect the temperature resulting in icy or slick conditions. Such factors may include atmospheric pressure and humidity, for example.

Transmitter 80 may be a wireless transmitter (e.g., line of sight infrared transmitter, or wireless RF transmitter) that is configured to emit wireless signals indicative of roadway conditions, to be received and used by a device 90 that is separate from safety marker 2, and configured to receive the wireless signal and communicate information to a driver or onlooker indicative of road conditions. For example, device 90 can be a sign positioned within a wireless range of transmitter 80, having a display 42 upon which a message indicative of road conditions can be displayed. In other embodiments, device 90 can be a portable computer incorporated into an automobile, or a user's smart phone or tablet computer programmed with a suitable app for interpreting and displaying information indicative of road conditions.

Accordingly, temperature sensing and switching circuit 78 transmits a first signal to transmitter 80 for re-transmission to the optional device 90, which may be a sign located on the side of the road with an LED display 42 arranged to communicate a message to drivers, such as, "Caution, roadway may be icy". Simultaneously, temperature sensing and switching circuit 78 may transmits a second signal to light control circuit 82 to energize first and/or second light sources 84 and 86. White light emissions from first or second light source 84 or 86 assist drivers in maintaining their respective positions in marked traffic lanes. Red light emissions from first or second light source 84 or 86 may warn drivers against entering the road from the wrong direction. Amber light emissions from a first or second light source 84 or 86 assist drivers in maintaining their respective positions in marked traffic lanes.

Figure 7:
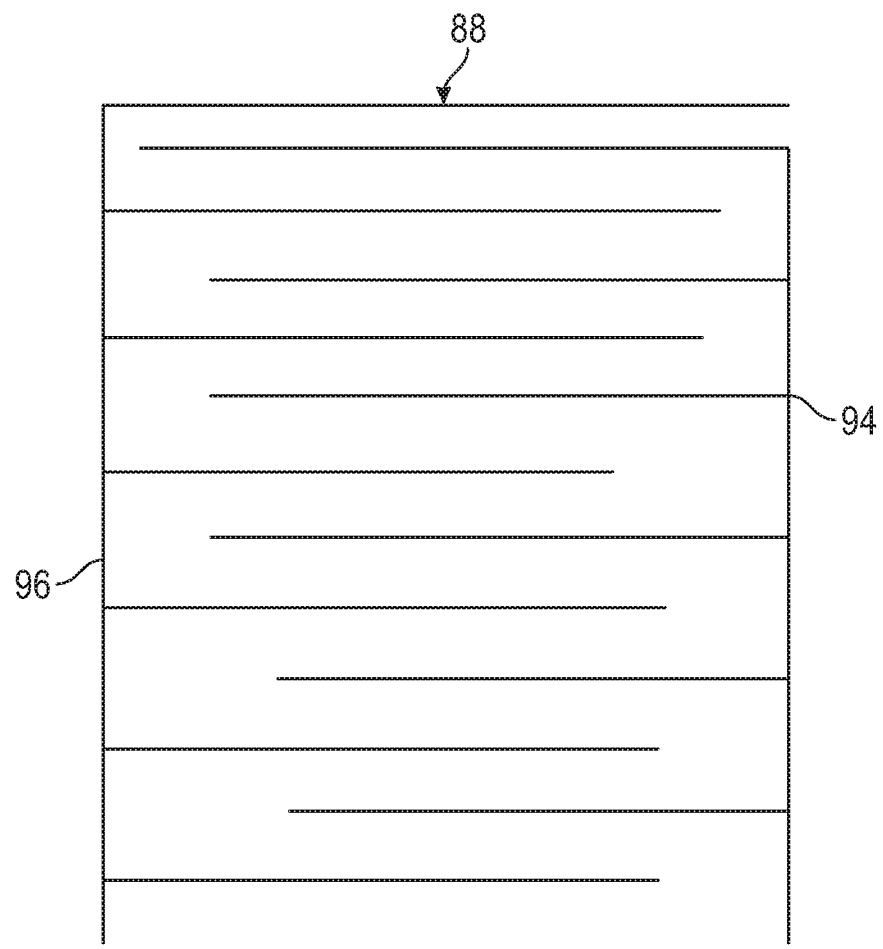
FIG. 7 is a top plan view of exemplary rain sensor in accordance with the present disclosure.

Referring now to FIG. 7, rain sensing circuit 88 is configured to sense the presence of moisture, and to provide one or more signals to temperature sensing and switching circuit 78 indicative of the presence or absence of moisture. Rain sensing circuit 88 can be implemented in a variety of ways. For example, in some embodiments, rain sensing circuit 88 may comprise a series of generally parallel interleaved 1.5 mm to 2 mm diameter wires 94 and 96 which are embedded into the outer surface of cover 8. The presence of moisture from rain or drizzle on cover 8 results in a change in resistance between interleaved wires 94 and 96, thereby generating a signal that is communicated to temperature sensing and switching circuit 78, which, in turn, energizes first and/or second light sources 84 and 86. Temperature sensing and switching circuit 78 may also provide a signal to transmitter 80 to cause transmitter 80 to generate wireless signals to device 90 to notify drivers of the presence of moisture and possibly slick roadway conditions. Thus, first light sources 84, when energized, assist drivers in maintaining their positions in marked traffic lanes during inclement weather, and second light sources 86, when energized, are positioned to warn drivers in inclement weather against entering the road from the wrong direction.

Figure 8A:
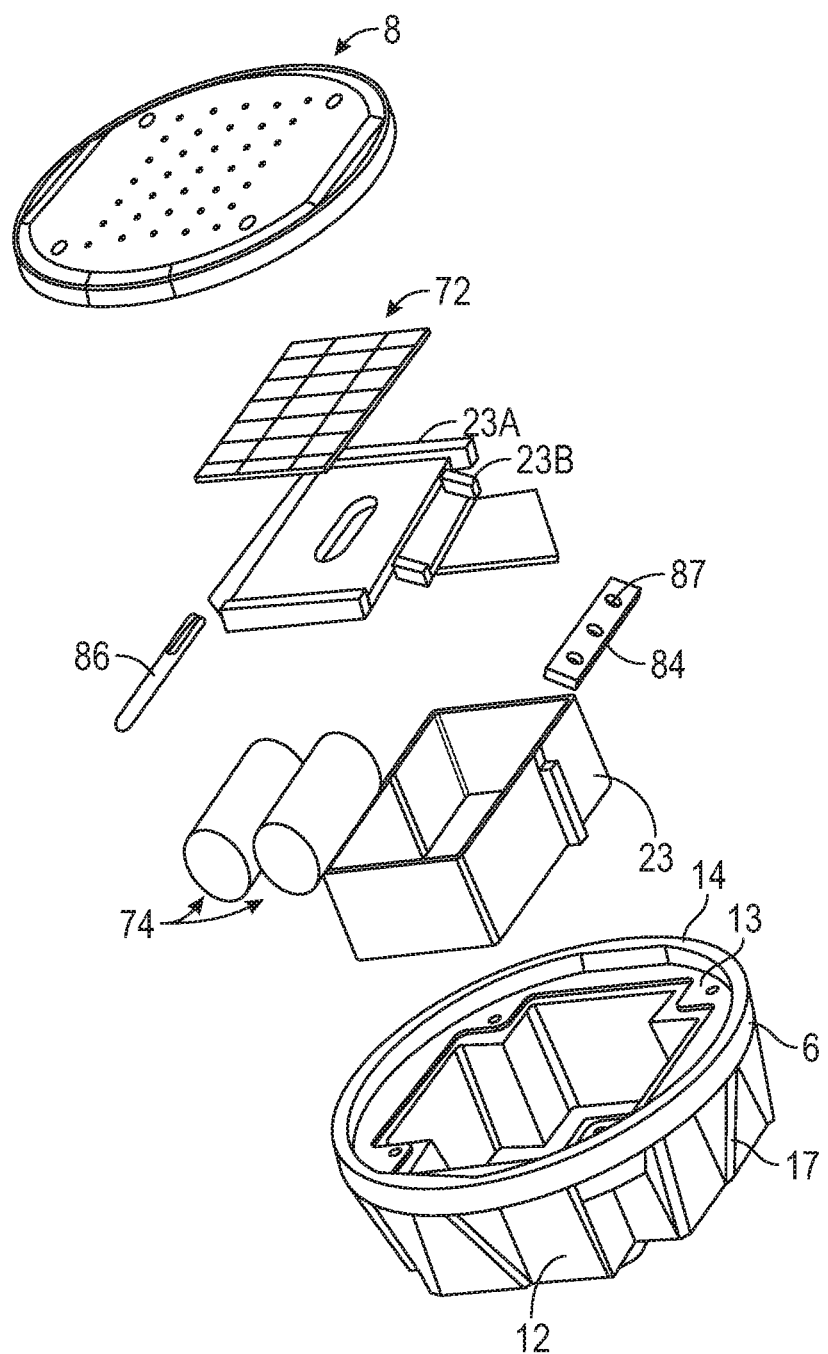
FIG. 8A is an exploded perspective view of a safety marker in accordance with the present disclosure.

Referring now to FIG. 8A, there is shown a simplified exploded perspective view of an improved safety marker 2 according to the disclosure which illustrates the relationship of certain components. The receptacle configuration comprising base 6 and sidewall 12 is shown in relation to an interior compartment 23 for housing the various circuit components and power storage unit 74, e.g., super capacitors. In this example, the interior compartment 23 is generally rectangular in shape, and includes a closed bottom. Interior compartment 23 includes an interior cover 23A configured to cover and mate with the interior compartment 23 to enclose the various circuit components and power storage units 74, e.g., super capacitors, positioned within the interior compartment 23. Not all components of the circuit 70 are shown in FIG. 8A for purposes of clarity. The interior cover 23A may include one or more side panels 23B for holding first and second light sources 84 and 86. In some examples, interior cover 23A may also provide an area between the side panels 23B for mounting solar cell 72 in an upwardly facing position. The area may be sized and configured to hold the solar cell 72 in a mating relationship. When the solar cell 72 is mounted within the interior cover 23A, the solar cell 72 is positioned below and in communication with cover 8 for sunlight exposure. In some embodiments, the interior compartment 23 supports all of the components within the circuit 70, including, but not limited to the solar cell 72, the first light source 84, the second light source 86, the power storage, the light sensing circuits 76, and the light control circuit 82. In the event that any of the components within the circuit 70 fail, the circuit 70 can be replaced by removing the cover 8, removing the interior compartment 23 supporting all of the components within the circuit 70, and placing another interior compartment 23 supporting all of the components within the circuit 70 into the base 6. In this manner, the safety marker 2 can be easily maintained by simply replacing the interior compartment 23 within a failed circuit 70 with another compartment 23 having a functioning circuit 70. In the example shown in FIG. 8A, the solar cell 72 is supported on an outside surface of the interior cover 23A. The interior cover 23A is a part of the interior compartment 23.

Figure 8B:
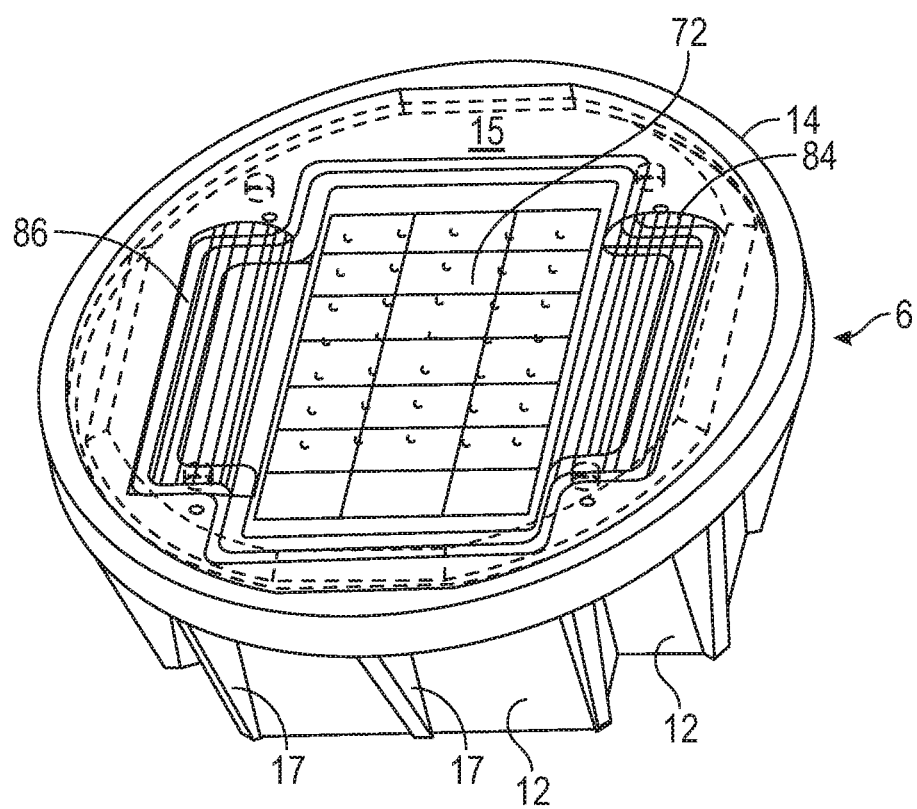
FIG. 8B is a perspective view of the safety marker according to an embodiment within the present disclosure which illustrates, in part, the relative positions of the solar cell and the first and second light sources.

Referring now to FIG. 8B, there is shown a perspective view of the safety marker 2 according to an example within the present disclosure without cover 8. FIG. 8B illustrates, in part, the relative positions of solar cell 72 and first and second light source 84 and 86. As shown, the solar cell 72 is positioned between the first and second light sources 84 and 86. In this example, the first and second light sources 84 and 86 border the solar cell 72, and are generally positioned between the solar cell 72, and the sidewall 12.

Figure 9:
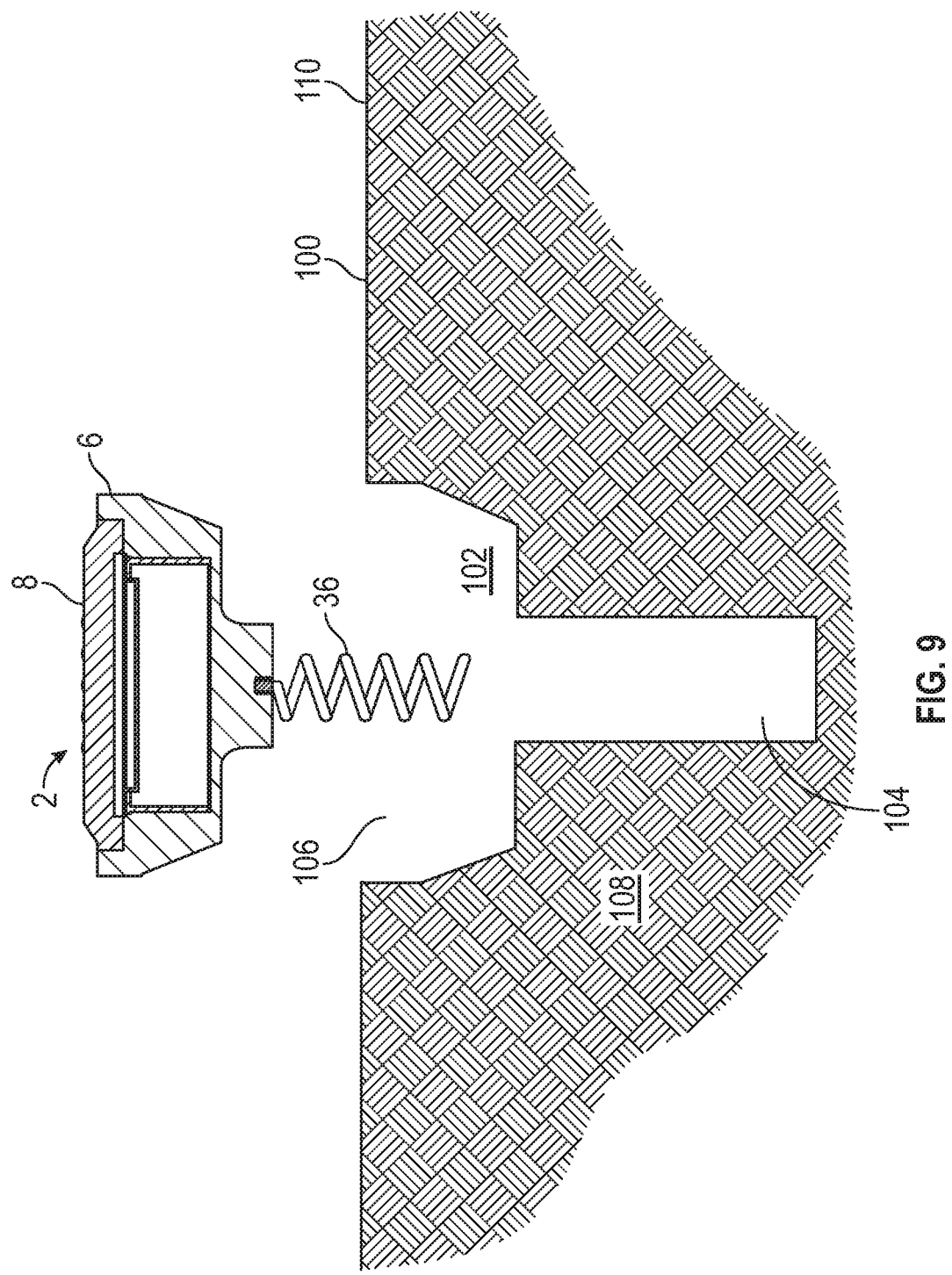
FIG. 9 is a sectional view which illustrates the safety marker according to the inventive concept(s) in relation to a road cross-section having been prepared to receive the safety marker.

Referring now to FIG. 9, there is shown a sectional view which illustrates an exemplary embodiment of how safety marker 2 may be mounted into a roadway surface 100. To install safety marker 2, an opening 102 is drilled or otherwise created to conform generally to the configuration of the fully assembled safety marker 2 described herein. Opening 102 will include a lower portion 104 shaped to receive spiral member 36, and an upper portion 106 shaped to receive base 6, such that a top of the base 6 is flush with road surface 110. For example, lower portion 104 may have a length greater than the length of spiral member 36, and a width greater than first diameter 56 and second diameter 58. Upper portion 106 may have a width greater than the width of base 6. Opening 102 can be formed with a stepped drill bit, for example. Once opening 102 is formed, a high-strength epoxy can be mixed and injected into opening 102, and then safety marker 2 having the spiral member 36 attached to the base 6 is disposed within opening 102. The epoxy will adhere to sub-surface composition 108 of roadway surface 100, and encompass, surround and adhere to all outer surfaces of safety marker 2, including spiral member 36, and the exterior surface of base 6, including fins 17. The surface provided by spiral member 36 and fins 17 enhance the total surface area of safety marker 2 that is available to bond with the epoxy. Once the epoxy has cured, safety marker 2 becomes securely anchored within opening 102. When fully installed, cover 8 of safety marker 2 is generally flush with respect to roadway surface 100.

Base 6 can be formed from a variety of environmentally friendly structural materials, including aluminum, carbon fiber, glass fiber, and engineering polymers. From available materials, metal usually outperforms other materials in terms of strength. However, metals are normally heavier due to a higher density. Because lower weight is desirable in this application, an engineering polymer is more desirable than metal. An engineering polymer which has exhibited the most satisfactory strength to weight properties for the instant application is nylon. Nylon is a tough, lightweight, elastic synthetic polyamide polymer which can be produced as filaments, sheets, or molded objects. Base 6 for the safety marker 2 described herein, comprising bottom portion 10, sidewalls 12, flange 13 and fins 17 can be injection molded as a single unit using a corresponding mold. Thickness of the various parts can vary over a wide range, although thicknesses in the range of from 0.5 in. to 0.75 in. provide a housing with optimum strength characteristics for the application. Cover 8 can be injection molded from nylon or from any other suitable engineering thermoplastic, such as, for example, a polycarbonate.

Figure 10:
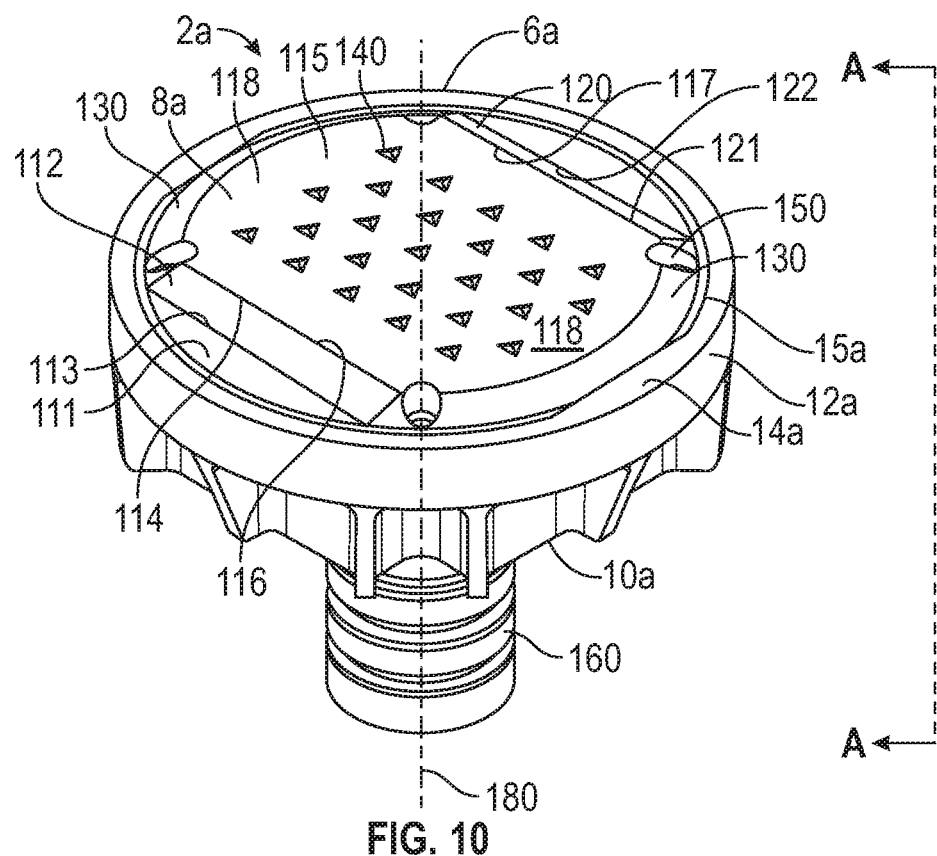
FIG. 10 is a top perspective view of another embodiment of a safety marker having a housing receptacle.

Referring now to FIG. 10, shown therein is another embodiment of a safety marker 2a constructed in accordance with the present disclosure. The safety marker 2a is similar in construction and function as the safety marker 2 described above, with the exception that the safety marker 2a includes a base 6a that includes a bottom portion 10a having at least one integrally formed projection 160. In this embodiment, the bottom portion 10a, including the projection 160, is integrally formed as a unitary structure. This can be accomplished, for example, by a molding process such as injection molding. As shown, the projection 160 may be positioned in a generally central location on the bottom portion 10a.

In a similar manner as the safety marker 2 discussed above, the safety marker 2a includes the circuit 70. The base 6a receives and supports the circuit 70. The circuit 70 is sealed within the base 6a by way of a cover 8a positioned within a recess 15a defined by an upstanding continuous sidewall 12a, terminated in a flange 13a having an upstanding peripheral edge 14a, and supported by the base 6a.

As illustrated in FIG. 10, the cover 8a has a flush surface 111, an ascending slope 112, an elevated surface 115, a descending slope 120, two or more sidewall 130, two or more protrusions 140, and one or more fastener junction 150. The cover 8a is sealed within the recess 15a so as to protect the circuit 70 from the outer environment. The ascending slope 112 has a first end 113 and a second end 114. The first end 113 of the ascending slope 112 connects to the flush surface 111. The ascending slope 112 rises upward from the flush surface 111 at an angle between 0° and 90° connecting the second end 114 of the ascending slope 112 to the elevated surface 115. The elevated surface 115 has a first end 116, a second end 117, and a top surface 118 disposed between the first end 116 and the second end 117. The first end 116 of the elevated surface 115 connects to the second end 114 of the ascending slope 112. The descending slope 120 has a first end 121 and a second end 122. The first end 121 of descending slope 120 connects to the second end 117 of the elevated surface 115. The descending slope 120 lowers downward from the horizontal plane at an angle between 0° and 270° connecting the second end 122 of the descending slope 120 to the flush surface 111. The two or more sidewall 130 are disposed adjacent to the ascending slope 112 and the descending slope 120, such that the two or more sidewall 130 connect the elevated surface 115 to the flush surface 111 adjacent the flush surface 111 connected to the ascending slope 112 and the descending slope 120.

The two or more protrusions 140 may be integrally connected to the elevated surface 115 extending upward from the top surface 118 of the elevated surface 115. In one embodiment, the two or more protrusions 140 may be adhered to the top surface 118 of the elevated surface 115 by any suitable methodology. The two or more protrusions 140 may be disposed in such a way as to create two or more distinct protrusions 140. The one or more fastener junction 150 connects the cover 8a to the recess 15a via a fastener, such as a screw.

In one embodiment, the cover 8a is oriented into the roadway surface 100, such that when a vehicle moves across the surface of the cover 8a the tires (for example) will rise off of roadway surface 100 via the ascending slope 112, travel across the elevated surface 115, and lower back to the roadway surface 100 via the descending slope 120.

The circuit 70, as discussed above, is configured to generate electricity, provide warning lights, and notify drivers and/or onlookers of current road conditions. In the example shown in FIG. 6 above, circuit 70 is provided with a plurality of circuit components including, but not limited to, the solar cell 72, power storage unit 74, the light sensing circuit 76, the temperature sensor and switching circuit 78, the transmitter 80, at least one light control circuit 82, the first light source 84, the second light source 86, and the rain sensing circuit 88. Examples of these circuit components are discussed above.

Figure 11:
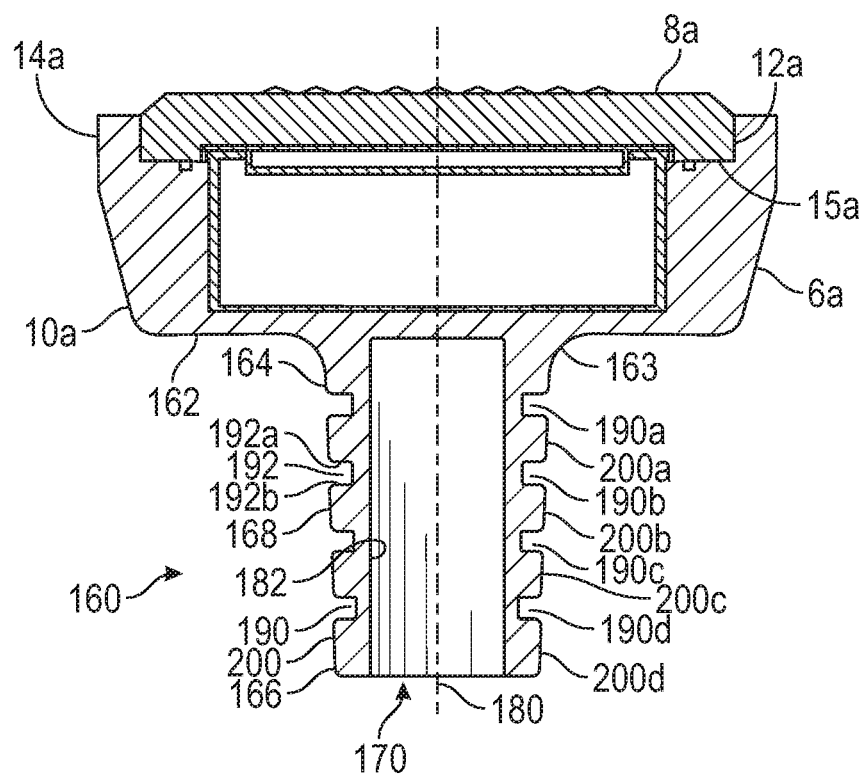
FIG. 11 is an exemplary vertical cross-sectional view of the housing receptacle of the safety marker taken along line A-A of FIG. 10.

Referring now to FIG. 11, shown therein is a cross-section of the base 6a taken along the lines A-A in FIG. 10. For purposes of clarity, the circuit 70 is not shown in FIG. 11. The projection 160 is integrally formed with other components of the bottom portion 10a of the base 6a. The bottom portion 10a includes a bottom surface 162. The projection 160 includes a first end 164 extending away from the bottom surface 162. The projection 160 may extend from the bottom surface 162 at an approximate 90° angle. To increase the strength of the bottom portion 10a, the bottom portion 10a includes an arcuate junction 163 between the projection 160 and the bottom surface 162. The arcuate junction 163 assists in preventing stress fractures. Two or more projections 160 may be used in some examples. The projection 160 is configured to extend vertically downward from the bottom surface 162 into sub-surface composition 108 when safety marker 2a is fully installed.

The projection 160 has the first end 164, a second end 166, and a sidewall 168. The first end 164 is positioned adjacent to the bottom surface 162, and the second end 166 is positioned distal the bottom surface 162 of the bottom portion 10a of the base 6a. In one embodiment, the sidewall 168 has a cylindrical shape surrounding an opening 170. It has been observed that the sidewall 168 of the projection 160 surrounding the opening 170, in some embodiments, increases a total surface area of the safety marker 2a in contact with and adhered to the high-strength epoxy used to secure the safety marker 2a, as discussed below, thereby increasing the installation's total gripping strength, and decreasing the likelihood that the safety marker 2a will be inadvertently dislodged from its anchor point in the road.

The sidewall 168 may extend perpendicularly from the bottom surface 162 of the bottom portion 10a of the base 6a vertically along a longitudinal axis 180, such that an inner surface 182 of the sidewall 168 surrounds the opening 170. The sidewall 168 has one or more channel 190 interleaved between two or more ridge portions 200. Four ridge portions 200 are shown in FIG. 11 and designated by the reference numerals 200a, 200b, 200c, and 200d by way of example. More or less of the channels 190 and ridge portions 200 can be provided. In the example shown in FIG. 11, the sidewall 168 has four channels 190, that are designated with the reference numerals 190a, 190b, 190c and 190d. The one or more channel 190 has one or more inner wall 192 of the sidewall 168 and two or more wall portions 192a and 192b. For purposes of clarity, only the inner wall 192 and the wall portions 192a, and 192b of the channel 190b have been labeled in FIG. 11. The channels 190a-d can be distinct and extend about the periphery of the sidewall 168. It should be understood that sidewall 168 may be provided with other configurations without departing from the spirit and scope of the disclosure. For example, sidewall 168 may have a generally uniform diameter, or an increasing diameter along its length, and produce satisfactory results. In some embodiments, the projection 160 may have a length in a range of from 3 inches to 9 inches between first end 164 and second end 166, and more preferably between 3-5 inches, and even more preferably about 4 inches. In one embodiment, two or more channels 190 (such as channels 190*b*, 190*c*, and 190*d*) may be interleaved between three ridge portions 200 (such as ridge portions 200*a*, 200*b*, 200*c*, and 200*d*). The channels 190 may be substantially perpendicular to the longitudinal axis 180 of the projection 160. In one embodiment, the channels 190 are evenly arranged along the longitudinal length of the projection 160. It has been observed that the presence of a plurality of channels 190 surrounding the periphery of the projection 160, in some embodiments, increases the total surface area of the safety marker 2*a* in contact with and adhered to the high-strength epoxy used to secure the safety marker 2*a*, as discussed below, thereby increasing the installation's total gripping strength, and decreasing the likelihood that the safety marker 2*a* will be inadvertently dislodged from its anchor point in the road.

Figure 12:
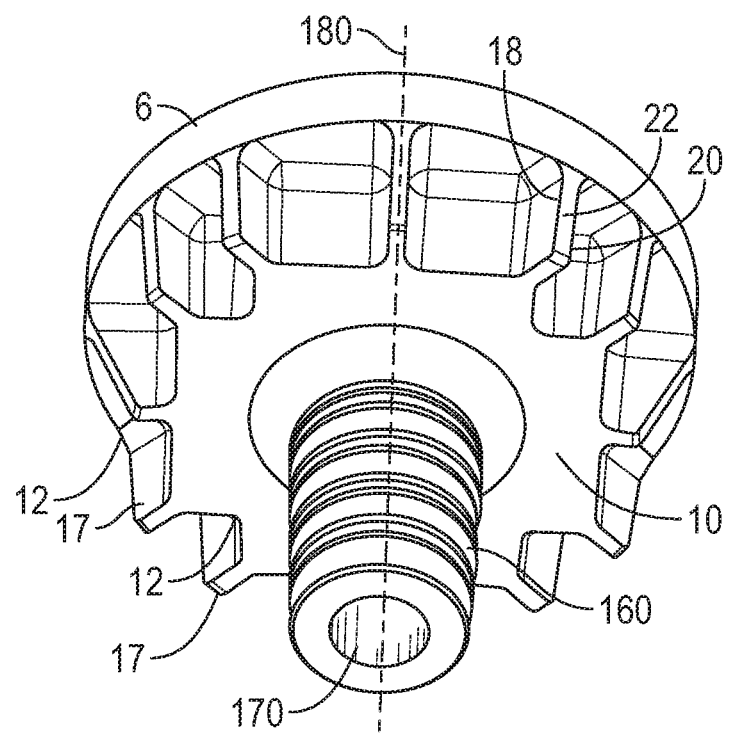
FIG. 12 is a bottom perspective view of the safety marker of FIG. 10, showing an exemplary projection according to one aspect of the inventive concept(s).
Figure 13:
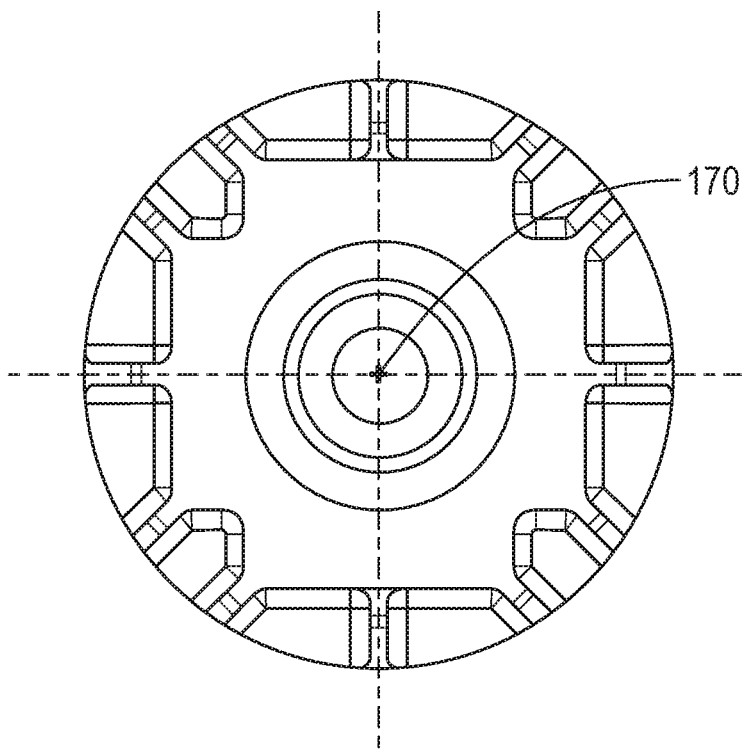
FIG. 13 is an exemplary bottom plan view of the housing receptacle of FIG. 10.

FIG. 12 shows a bottom perspective view of the safety marker 2*a*, including the bottom portion 10*a*, the base 6*a*, and the projection 160. FIG. 13 shows a bottom plan view of the safety marker 2*a*. As shown in FIG. 13, the projection 160 can be centrally located on the bottom surface 162 of the bottom portion 10*a*.

Figure 14:
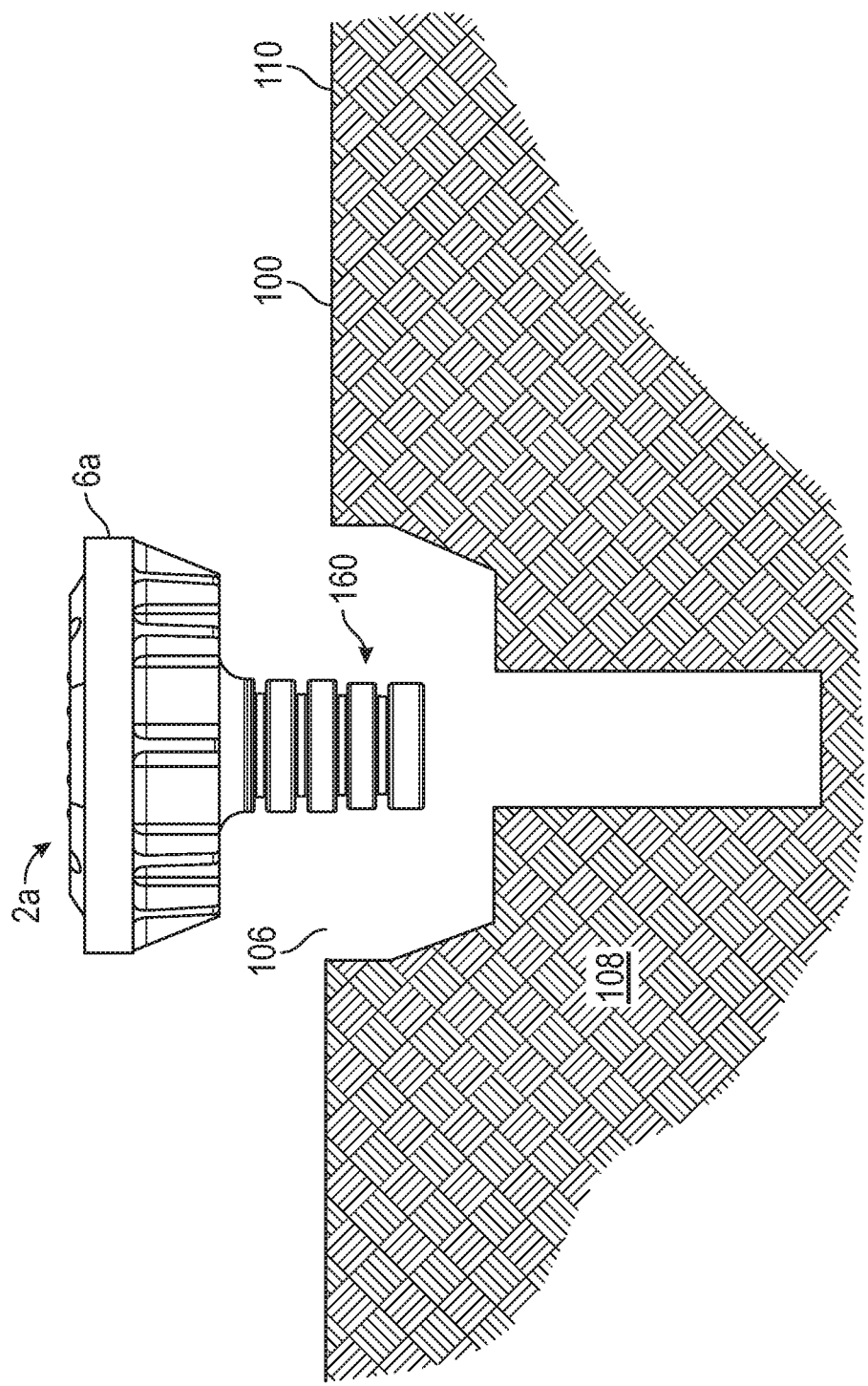
FIG. 14 is a partial sectional view which illustrates the safety marker of FIG. 10 in relation to a road cross-section having been prepared to receive the safety marker.

FIG. 14 is a sectional view which illustrates an exemplary embodiment of how safety marker 2*a* having the projection 160 may be mounted into the roadway surface 100. The safety marker 2*a* can be installed into the roadway surface 100 in an identical manner as the safety marker 2 is installed into the roadway surface 100.

As those skilled in the art will appreciate, numerous modifications and variations of the described and claimed inventive concept(s) are possible in light of these teachings, such as digital control components in lieu of conventional electrical control components, and all such are contemplated hereby. The present invention contemplates and claims those inventions that may result from the combination of features described herein and those of the cited prior art references which complement the features of the present invention.

What is claimed is:

1. A safety marker, comprising:
    a housing comprising a base having a bottom portion, an upstanding side wall attached to the bottom portion to define a receptacle, the sidewall terminating in a flange having an upstanding peripheral edge defining a recess, a plurality of outwardly extending fins attached in generally spaced relationship about the periphery of the sidewall below the flange;
    projection having one end attached to the bottom portion with an opposing end extending vertically downward therefrom, the projection having a sidewall surrounding an opening, the sidewall of the projection having one or mare channel interleaved between ridge portions; and
    a cover shaped to conform to the recess in the flange to seal the receptacle.

2. The safety marker of claim 1, wherein the base is constructed of an engineering polymer.

3. The safety marker of claim 1, further comprising a circuit including:
    at least one first light source and at least one second light source mounted within said receptacle and arranged to transmit light from each source outwardly in a predetermined direction toward vehicular or pedestrian traffic; and
    at least one photovoltaic solar cell positioned within said receptacle to absorb sunlight as a source of electrical energy to power each of said at least one first light source and at least one second light source;
    a power storage unit configured to receive energy from the photovoltaic solar cell and store unused electrical energy generated by the solar cell;
    at least one light sensing circuit positioned within said receptacle and arranged to receive input from either said photovoltaic solar cell or said power storage unit and thereby produce an output signal; and
    a light control circuit receiving the output signal and energize said at least one first light source and at least one second light source in response to a low light condition.

4. The safety marker of claim 3, further comprising an interior compartment supporting the circuit, the interior compartment being removable from the base of the housing.

5. The safety marker of claim 3, wherein the circuit further comprises a temperature sensing and switching circuit positioned within said receptacle and communicating with said power storage unit, the temperature sensing and switching circuit configured to sense a temperature below a set point and provide an output signal.

6. The safety marker of claim 1, further comprising a circuit including:
    at least one first light source and at least one second light source mounted within said receptacle and arranged to transmit light from each source outwardly in a predetermined direction toward vehicular or pedestrian traffic; and
    at least one photovoltaic solar cell positioned within said receptacle to absorb sunlight as a source of electrical energy to power each of said at least one first light source and at least one second light source;
    a power storage unit configured to receive energy from the photovoltaic solar cell and store unused electrical energy generated by the solar cell;
    a light control circuit;
    a rain sensor circuit embedded within an outer surface of said cover to sense a presence of moisture in a form of rain or drizzle and provide an output signal; and
    wherein the light control circuit receives the output signal and energizes at least one of the first light source and the second light source.

7. The safety marker of claim 6, wherein said rain sensor circuit comprises a series of generally parallel interleaved wires which are embedded into the outer surface of said cover whereby the presence of moisture from rain or drizzle on said cover results in a change in resistance between said interleaved wires, thereby generating the output signal.

8. A method, comprising:
    creating an opening in a roadway surface, the opening having an upper portion having a first width, and a lower portion having a second width, the second width less than the first width;
    placing the bonding material, in liquid form, into the opening; and
    placing a safety marker of claim 1 within the opening such that a projection of the safety marker is within the lower portion of the opening, and a base of the safety marker is within the upper portion of the opening such that the bonding material encompasses, surrounds and adheres to outer surfaces of the roadway, the projection and the base.

9. The method of claim 8, wherein creating the opening is defined further as using a drill and a stepped drill bit to create the opening in the roadway surface.

10. The method of claim 8, wherein the base includes a plurality of outwardly extending fins, and wherein placing the safety marker within the opening includes submerging the fins of the base into the bonding material.

11. The method of claim 8, wherein the projection has a first length, and the lower portion has a second length, and wherein the second length of the lower portion is greater than the first length of the projection.

12. The method of claim 8, wherein the upper portion of the opening is shaped to conform to a shape of the base of the safety marker.

13. A safety marker, comprising:
   a housing comprising a base having a bottom portion, an upstanding side wall attached to the bottom portion to define a receptacle, the sidewall terminating in a flange having an upstanding peripheral edge defining a recess, a plurality of outwardly extending fins attached in generally vertical spaced relationship about the periphery of the sidewall below the flange;
   a projection having a first end and a second end, the first end of the projection attached to the bottom portion, the projection extending vertically downward from the bottom portion such that the second end is positioned a distance from the bottom portion, the projection surrounding an opening; and
   a cover shaped to conform to the recess in the flange to seal the receptacle.

14. The safety marker of claim 13, wherein the first end of the projection is integrally formed with the bottom portion such that the first end of the projection and the bottom portion are a unitary structure.

15. The safety marker of claim 13, wherein the projection further comprises a sidewall surrounding the opening, the sidewall having an outer surface shaped so as to define a first channel and a second channel, the first channel being separate from the second channel.

16. The safety marker of claim 15, wherein the first channel is ring shaped and extends about a periphery of the sidewall.

17. The safety marker of claim 15, wherein the sidewall is cylindrically-shaped.

18. The safety marker of claim 15, wherein the sidewall of the projection, further comprises:
   a wall portion extending from the first end to the second end; and
   a ridge portion extending from the wall portion between the first channel and the second channel.

19. The safety marker of claim 16, wherein the wall portion has an inner surface defining the opening.

20. The safety marker of claim 13, wherein the projection includes a spiral member.

21. A safety marker, comprising:
   a housing comprising a base having a bottom portion, an upstanding side wall attached to the bottom portion to define a receptacle, the sidewall terminating in a flange having an upstanding peripheral edge defining a recess, a plurality of outwardly extending fins attached in generally spaced relationship about the periphery of the sidewall below the flange;
   an interior, the circuit comprising: compartment positioned within the base of the housing;
   a circuit supported by the interior compartment:
      at least one first light source and at least one second light source mounted within said receptacle and arranged to transmit light from each source outwardly in a predetermined direction toward vehicular or pedestrian traffic; and
      at least one photovoltaic solar cell positioned within said receptacle to absorb sunlight as a source of electrical energy to power each of said at least one first light source and at least one second light source;
      a power storage unit configured to receive energy from the photovoltaic solar cell and store unused electrical energy generated by the solar cell;
      at least one light sensing circuit positioned within said receptacle and arranged to receive input from either said photovoltaic solar cell or said power storage unit and thereby produce an output signal; and
      a light control circuit configured to receive the output signal and energize said at least one first light source and at least one second light source in response to a low light condition; and
   a cover shaped to conform to the recess in the flange to seal the receptacle.

22. The safety marker of claim 21, further comprising a projection having a first end and a second end, the first end of the projection attached to the bottom portion, the projection extending vertically downward from the bottom portion such that the second end is positioned a distance from the bottom portion, the projection surrounding an opening.

* * * * *

UNITED STATES PATENT AND TRADEMARK OFFICE
CERTIFICATE OF CORRECTION

Page 1 of 1

PATENT NO.      : 10,851,502 B2
APPLICATION NO. : 16/447661
DATED           : December 1, 2020
INVENTOR(S)     : Harold Smart It is certified that error appears in the above-identified patent and that said Letters Patent is hereby corrected as shown below:

In the Claims
Column 13, Line 49: Delete "side wall" and replace with --sidewall--
Column 13, Line 55: Before "projection" insert --a--
Column 13, Line 59: Delete "mare" and replace with --more--
Column 15, Line 24: After "generally" delete "vertical"
Column 16, Line 11: Delete "side wall" and replace with --sidewall--
Column 16, Line 17: After "an interior" delete ", the circuit comprising:"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*